UNITED STATES PATENT OFFICE 2,268,484

RECOVERY OF TIN

Barlow W. Hill, Chicago, Ill.

No Drawing. Application April 18, 1941,
Serial No. 389,199

8 Claims. (Cl. 75—64)

This invention relates to recovery of tin and iron from so-called tin cans and the like and, among other objects, aims to provide a simple and inexpensive process for more efficiently recovering the metals and improving their quality.

The nature of the invention may be readily understood by reference to one illustrative process embodying the invention and described in the following specification.

Heretofore it has been impossible or prohibitively expensive to recover tin from old tin cans. Moreover, because of the presence of tin and lead in the metal, the iron recovered has been of poor quality and has had only a very limited use. Recovery of tin from scrap tin in the mills does not involve the problems presented by old tin cans which bear labels or lacquer and usually remnants of their contents and other contamination from the dump. Heretofore about the only profitable use for such cans has been for very cheap cast metal for sash weights and the like. In a single plant melting old tin cans for cheap sash weights and the like, between $500 to $1,000 per day in recoverable tin is lost.

I have discovered that if the tine on the cans be first fully oxidized it can then be separated from the iron without substantially alloying therewith. In one satisfactory process the cans, before being crushed or compressed, are first heated in a furnace or the like to burn off the labels, lacquer and organic material. The temperature is preferably raised during the process (and preferably after the preliminary destruction of the aforesaid foreign substances) to a dull red heat with free access of air to oxidize the tin. This temperature may vary widely since it merely determines the speed of oxidation of the tin. However, it is preferable that there be a minimum oxidation of the iron, which, of course, tends to increase at higher temperatures. For reasons which I am not able fully to explain, the tin does not run off the iron though the temperatures are substantially above the melting point of tin. Moreover, the tin does not alloy with the iron. Probably the thinness of the coating of tin and prompt surface oxidation thereof are to some extent responsible for the fact that the tin does not run off the iron even though it does not alloy therewith. If the cans were crushed before melting, alloying of tin with the iron would occur, probably because there is very limited exposure of the tin to oxygen.

Some tin is volatilized during this oxidation process as flowers of tin but these are advantageously recovered by an electrostatic precipitator. Such devices and their operation are well understood in metallurgy and other industries and need not be further described herein.

After the oxidation process, the cans are crushed or compressed and preferably melted with a flux containing a chemical or chemicals for combining with the tin oxide. For example, an alkali or alkaline earth carbonate or hydroxide, such as sodium carbonate, is used for this purpose. This results in the formation of recoverable stannates. Where sodium carbonate is used, the tin is recovered as sodium stannate. The stannates, as well as impurities, will be found in the slag which rises upon melting. The tin may advantageously be extracted from the slag and reduced with coke in a small blast furnace or the like by conventional methods.

Even if the slag contains no reacting chemicals to form stannates, the tin oxide tends to stick to the slag by which it may be separated from the molten iron or steel.

I have found that alkali or alkaline earth chlorides and particularly bi or trivalent chlorides, such as calcium chloride, may also be used in this process to combine with the tin oxide to produce stannic chloride which distills off and is condensed. It is not necessary that the stannic chloride be reduced to metallic tin since there is a substantial market for stannic chloride itself.

Melting may be effected by a variety of methods, such as cupola, open hearth or high frequency induction furnaces. The latter is relatively more expensive for melting, but is advantageous for completing the process (after melting, which may be effected by other means) because of the stirring action obtainable by imposing a lower frequency, say 60 cycles, on the furnace. In that case the high frequency is employed simply to hold the heat. The stirring action produces complete reaction between the tin oxide and the chemicals in the slag, insuring not only full recovery of tin but absence of tin oxide in the iron or steel, which is therefore adapted for more profitable uses than heretofore.

If a non-reacting slag be used (i. e. a slag containing no chemicals for combining with the tin oxide) the aforesaid agitating action of the induction furnace is efficient in bringing the tin oxide into contact with the slag to which it sticks and by means of which it may be removed.

The oxidizing step may be combined with the melting step but in that event the recovery of tin is not likely to be so high since access of oxygen to the heated tin will not be complete, making it possible for the tin to alloy in unoxidized state with the iron from which it cannot be separated by any inexpensive or practicable means.

Obviously the invention is not limited to the details of the illustrative method since these may be variously modified. Moreover, it is not indispensable that all features of the invention be used conjointly since various features may be used to advantage in different combinations and sub-combinations.

Having described my invention, I claim:

1. The method of separating tin from the iron in tin cans and the like which comprises oxidizing the tin on the cans and then separating the same from the cans by melting the cans in a furnace with substances to form a slag and removing the tin with the slag.

2. The method of separating tin from the iron in tin cans which comprises oxidizing the tin on the cans, melting the cans with substances to form a slag which reacts with the tin oxide, removing the tin from the iron with the slag, and later recovering the tin from the slag.

3. The method of separating tin from the iron in tin cans which comprises oxidizing the tin on the cans, melting the cans with slag-forming materials including one or more of substances of the class of alkalis or alkaline earth carbonates or hydroxides, causing the slag to react with the tin oxide to form stannates, removing the slag, and recovering the tin from the slag.

4. The method of separating tin from the iron in tin cans which comprises oxidizing the tin on the cans, melting the cans with slag-forming materials including one or more of substances of the class of chlorides of metals or non-metals, causing the slag to react with the tin oxide to form stannic chloride, distilling off the stannic chloride and recovering the same.

5. The method of separating tin from the iron in tin cans which comprises oxidizing the tin on the cans, melting the cans with slag-forming materials including one or more of substances of the class of bi or trivalent chlorides of metals or non-metals.

6. The method of separating tin and iron in scrap tin cans and the like which comprises heating the cans to convert the tin to a tin oxide, melting the cans with slag-forming materials, agitating the melt to bring the tin oxide into intimate contact with the slag materials to cause the latter to pick up and hold the tin oxide, then withdrawing the slag, and recovering the tin therefrom.

7. The method of separating tin and iron in scrap tin cans and the like which comprises heating the cans to convert the tin to a tin oxide, melting the cans with slag-forming materials, creating a low frequency induction current in the melt to agitate the same to bring the tin oxide and slag into intimate contact so as to cause the slag to pick up and hold the tin oxide, then withdrawing the slag, and recovering the tin therefrom.

8. The method of separating tin and iron in scrap tin cans and the like which comprises burning off the labels, lacquer and other foreign material from the cans, heating the cans to oxidize the tin to tin oxide, crushing the cans and melting the same with materials to form a slag, agitating the melt to separate the iron from the slag, tin and other foreign materials, and withdrawing the tin and foreign materials with the slag and then recovering the tin from the slag by reduction.

BARLOW W. HILL.